(12) United States Patent
Liu

(10) Patent No.: US 12,494,994 B2
(45) Date of Patent: Dec. 9, 2025

(54) METHODS FOR VERIFYING SERVICE FUNCTION CHAIN, SENDING NODE, FORWARDER NODE, AND SERVICE FUNCTION NODE

(71) Applicant: ZTE CORPORATION, Guangdong (CN)

(72) Inventor: Yao Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 600 days.

(21) Appl. No.: 17/919,567

(22) PCT Filed: Mar. 16, 2021

(86) PCT No.: PCT/CN2021/081059
§ 371 (c)(1),
(2) Date: Oct. 18, 2022

(87) PCT Pub. No.: WO2021/213082
PCT Pub. Date: Oct. 28, 2021

(65) Prior Publication Data
US 2023/0171183 A1     Jun. 1, 2023

(30) Foreign Application Priority Data

Apr. 22, 2020   (CN) .......................... 202010322387.8

(51) Int. Cl.
*H04L 45/00*    (2022.01)
(52) U.S. Cl.
CPC .............. *H04L 45/34* (2013.01); *H04L 45/54* (2013.01)
(58) Field of Classification Search
CPC ................................. H04L 45/34; H04L 45/54
(Continued)

(56) References Cited

U.S. PATENT DOCUMENTS

2019/0036818 A1\* 1/2019 Nainar .................... H04L 45/34
2020/0084143 A1\* 3/2020 Gandhi ................... H04L 45/24

FOREIGN PATENT DOCUMENTS

| CN | 105337785 A | 2/2016 |
| CN | 105577416 A | 5/2016 |
| CN | 106612267 A | 5/2017 |

OTHER PUBLICATIONS

WIPO, International Search Report issued on May 28, 2021.

\* cited by examiner

*Primary Examiner* — Hermon Asres
(74) *Attorney, Agent, or Firm* — Li & Cai Intellectual Property (USA) Office

(57) ABSTRACT

An embodiment of the present disclosure provides a method for verifying a service function chain, which is applied by a sending node, and the method includes: sending service function chain verification request information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node. Moreover, a sending node, a forwarder node and a service function mode are provided.

19 Claims, 9 Drawing Sheets send SFC verification request information ⟶ S101

(58) Field of Classification Search
USPC .......................................................... 370/351
See application file for complete search history.

METHODS FOR VERIFYING SERVICE FUNCTION CHAIN, SENDING NODE, FORWARDER NODE, AND SERVICE FUNCTION NODE

TECHNICAL FIELD

Embodiments of the present disclosure relate to, but are not limited to, the field of Service Function Chain (SFC) technology.

BACKGROUND

The SFC technology is the technology of providing ordered services for an application layer, and enables a packet to sequentially pass through service function devices along a designated path by adding SFC path information to the packet, so as to logically connect Service Functions (SFs) of network devices to form an ordered SF combination. For example, reference may be made to FIG. 17 for a logical structure of the SFC.

SUMMARY

The embodiments of the present disclosure provide methods for verifying a service function chain, a sending node, a service function forwarder node, and a service function node.

In a first aspect, an embodiment of the present disclosure provides a method for verifying a service function chain applied by a sending node, including: sending service function chain verification request information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

In a second aspect, an embodiment of the present disclosure provides a method for verifying a service function chain applied by a service function forwarder node, including: receiving service function chain verification request information sent by a sending node; and verifying a subordinate service function node to be verified according to the service function chain verification request information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

In a third aspect, an embodiment of the present disclosure provides a method for verifying a service function chain applied by a service function node, including: receiving, from a superordinate connected service function forwarder node, service function chain verification request information sent by a sending node; and performing verification according to the service function chain verification request information to obtain verification feedback information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

In a fourth aspect, an embodiment of the present disclosure provides a sending node, including: a first sending module configured to send service function chain verification request information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

In a fifth aspect, an embodiment of the present disclosure provides a service function forwarder node, including: a second receiving module configured to receive service function chain verification request information sent by a sending node; and at least one processor configured to verify a subordinate service function node to be verified according to the service function chain verification request information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

In a sixth aspect, an embodiment of the present disclosure provides a service function node, including: a fourth receiving module configured to receive, from a superordinate connected service function forwarder node, service function chain verification request information sent by a sending node; and at least one processor configured to perform verification according to the service function chain verification request information to obtain verification feedback information; and the service function chain verification request information is a Segment Routing packet, and a Segment List of the service function chain verification request information at least includes a Segment ID of a service function node to be verified; the service function chain verification request information includes a verification request configured to request a service node of a service function chain to verify the service function node to be verified so as to verify the service function chain, and send a verification result to a check node; and the service node includes a service function node and a service function forwarder node.

BRIEF DESCRIPTION OF DRAWINGS

The accompanying drawings are intended to provide a further understanding of the embodiments of the present disclosure and constitute a part of the specification. Together with the embodiments of the present disclosure, the drawings are used to explain the embodiments of the present disclosure, but do not constitute any limitation to the present disclosure. The above features and advantages and other features and advantages will become more apparent to those of ordinary skill in the art from the description of exemplary embodiments with reference to the drawings. In the drawings.

DETAIL DESCRIPTION OF EMBODIMENTS

In order to enable those of ordinary skill in the art to better understand the technical solutions of the embodiments of the present disclosure, the methods for verifying an SFC, the sending node, the SFF node, and the SF node provided by the embodiments of the present disclosure are described in detail below with reference to the drawings.

The embodiments of the present disclosure will be described more fully below with reference to the drawings, but the embodiments illustrated herein may be embodied in different forms, and should not be interpreted as being limited to embodiments described herein. Rather, the embodiments are provided to make the present disclosure thorough and complete, and are intended to enable those of ordinary skill in the art to fully understand the scope of the present disclosure.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

The embodiments described herein and the features therein can be arbitrarily combined with one another if no conflict is incurred.

The terms used herein are merely used to describe specific embodiments, and are not intended to limit the present disclosure. The term "and/or" used herein includes one associated listed item or any and all combinations of one or more of the associated listed items. As used herein, "a" and "the" which indicate a singular form are intended to include a plural form, unless expressly stated in the context. The terms "comprise" and "be made of" used herein indicate the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Figure 17:
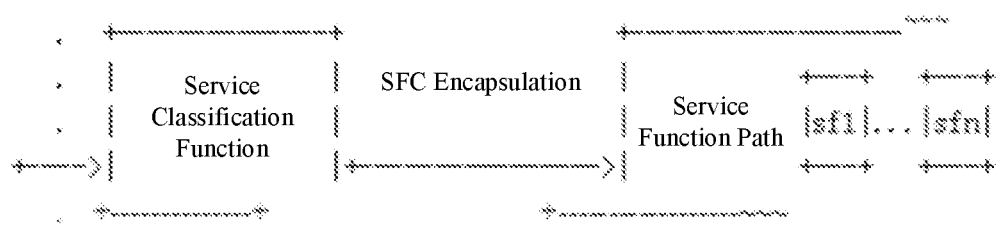
FIG. 17 is a schematic diagram of a logical structure of an SFC according to an embodiment of the present disclosure.

The SFC technology is the technology of providing the ordered services for the application layer, and enables the packet to sequentially pass through the service function devices along the designated path by adding the SFC path information to the packet, so as to logically connect the SFs of the network devices to form the ordered SF combination. For example, reference may be made to FIG. 17 for the logical structure of the SFC.

In order to ensure deployment correctness of an SFC, the SFC needs to be verified from a data plane after programming of the SFC is completed. For example, whether each service function on the SFC is programmed in an expected order or whether a function is normal is verified.

However, an SFC verification method for Network Service Header (NSH) implemented based on separation of service-plane encapsulation and forwarding-plane encapsulation is not applicable in many aspects.

The embodiments of the present disclosure are implemented in a Segment Routing (SR) network capable of realizing the SFC.

Figure 11:
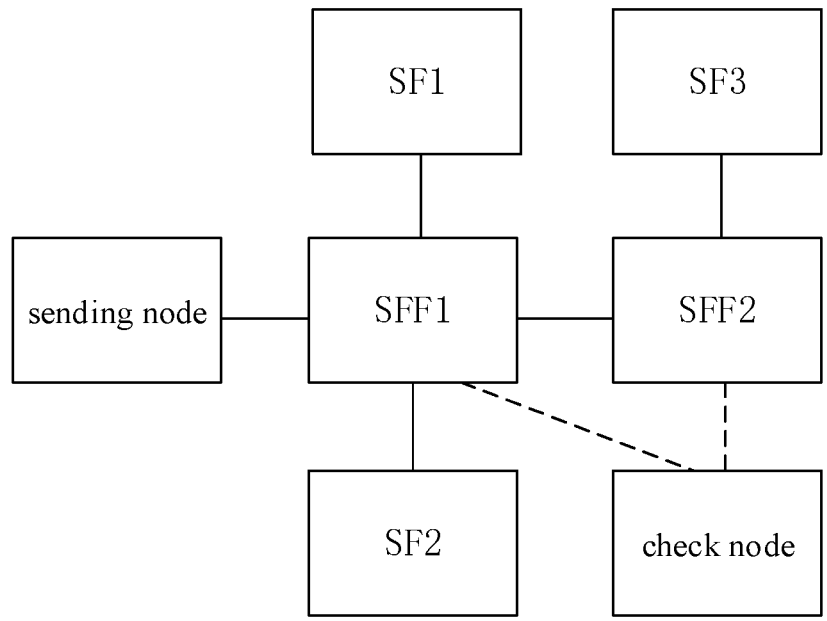
FIG. 11 is a schematic structural diagram of a network used in a method for verifying an SFC according to an embodiment of the present disclosure.

With reference to FIG. 11, the above network includes a plurality of interconnected SFF nodes, each of which has one or more subordinate SF nodes. The SFF node may forward a packet to an SF node connected thereto or an SFF node connected thereto. Each SF node may perform a specific SF, such as a firewall (FW) function, or a load balancing (LB) function.

The SR is a routing method based on a source address. In the SR, a Segment Routing Header (SRH) is added to a packet header of a Multi-Protocol Label Switching (MPLS) network or an Internet Protocol Version 6 (IPv6) network, and the SRH carries a series of indication operations (also called segment operations) for achieving routing and transmission of the packet in the network. For example, the indication operations in the SRH may be implemented by a plurality of Segment IDs (SIDs) in a Segment List of the SRH.

SR-based MPLS is called SR-MPLS.

SR-based IPv6 is called SRv6, and an SID of the SRv6 is a 128-bit number, and may also be called SRv6 SID. The SRv6 SID is a network instruction which consists of two parts, i.e., Locator and Function, the Locator mainly plays a routing role and is therefore unique in an SR domain, and the Function may represent any function (operation) of a device, such as forwarding or service. The structure of SRv6 SID is more favorable for conveniently performing Network Programming.

When the SFC is implemented based on the SR, SR Service Programming, i.e., to associate an SF with an SID, is needed. For example, the SID is included in the Segment List of the SRH, and designates a route together with other SIDs, thereby completing the Service Programming to implement functions of the SFC.

If an SF node itself does not support an SR function, an SR Proxy may be needed to make the SF node be applicable to the SR, in which case the SF node together with the SR Proxy may be regarded as one SF node supporting the SR function.

In a first aspect, an embodiment of the present disclosure provides a method for verifying an SFC, which is applied by a sending node.

The embodiment of the present disclosure is used for realizing verification of an SFC, and the method provided by the embodiment of the present disclosure can be used for being executed by the sending node.

The sending node may be a certain dedicated node in a network, that is, a node dedicated to execution of the method provided by the embodiment of the present disclosure; or, the sending node may be any conventional node (a Classifier node) in the network; or, any node that executes the method provided by the embodiment of the present disclosure is the sending node.

Figure 1:
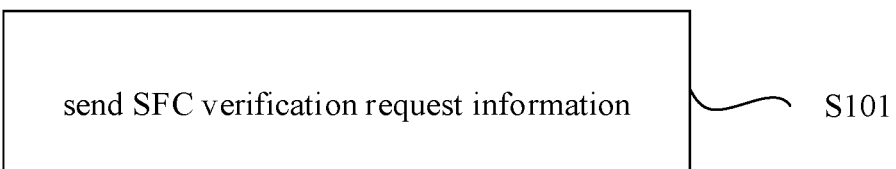
FIG. 1 is a flowchart illustrating a method for verifying an SFC according to an embodiment of the present disclosure.

With reference to FIG. 1, the method provided by the embodiment of the present disclosure includes: S101, sending SFC verification request information.

The SFC verification request information is an SR packet, and a Segment List of the SFC verification request information at least includes an SID of an SF node to be verified; the SFC verification request information includes a verification request configured to request a service node of the SFC to verify the SF node to be verified so as to verify the SFC and send a verification result to a check node; and the service node includes an SF node and an SFF node.

The sending node (Sender) in the network sends the information (the SFC verification request information) configured to request verification of the SFC to the SFC, so as to perform the verification of the SFC.

The SFC verification request information is in the form of SR packet, and the Segment List of an SRH of the SFC verification request information includes the SID of the SF node which needs to be verified (the SF node to be verified). Meanwhile, the SFC verification request information further includes the verification request which requests verification of the SF node to be verified.

Thus, each service node in the network may send the SFC verification request information to the SF node to be verified or a superordinate SFF node connected to the SF node to be verified according to the SID of the SF node to be verified, perform requested verification on the SF node to be verified according to the verification request, send a result (the verification result) obtained through the verification to the specific check node (Receiver), and verification (such as path verification and function verification) of the whole SFC may be achieved by summarizing the verification result.

According to the embodiment of the present disclosure, the SFC verification request information is sent in an SR manner, which may not only allow the SFC verification request information to be forwarded along a predetermined path of the SFC, but may also directly determine specific information of each SF node on the SFC according to the returned verification result, thereby achieving complete verification (such as the path verification and the function verification) of the SFC. Meanwhile, the SIDs are used in the SR technology to explicitly indicate all SFF nodes and all SF nodes on the SFC, and a network programming function of the SR may also be used to make the verification more conveniently and more easily.

Apparently, it should be understood that the above check node may be a node (including the sending node) in a forwarding plane, or a node in a control plane, such as a Software Defined Network (SDN) controller or a centralized monitoring system.

Apparently, it should be understood that the Segment List of the SFC verification request information "including the SID of the SF node to be verified" does not indicate that the Segment List of the SFC verification request information excludes SIDs of other service nodes (SF nodes and SFF nodes).

Illustratively, the SR packet is transmitted according to the SID in the Segment List of the SR packet. In order to verify the SF node to be verified, the SFC verification request information (the SR packet) may at least include the SID of the SF node to be verified. But the SFC verification request information may further include other SIDs, e.g., SIDs of all service nodes between the sending node and the SF node to be verified along the path of the SFC, or SIDs of all service nodes of the whole SFC, so that a transmission path of the SFC verification request information may be better defined. Apparently, when the SFC verification request information includes SIDs of SF nodes not to be verified, the SFC verification request information does not request verification of those SF nodes.

Apparently, it should be understood that the SFC verification request information needs to indicate in some way which SID therein corresponds to the SF node to be verified.

For example, the parameter HOP count indicating a HOP number of the SF node to be verified in the SFC may be set in the SFC verification request information, and the HOP count is reduced by 1 after the SFC verification request information passes through each SF node, so that the SF node which is reached by the SFC verification request information when the HOP count is 1 is the SF node to be verified.

Or, a specific identifier may be added to the SID of the SF node to be verified; or the SF node to be verified is marked separately at another position of the SFC verification request information.

Or, if the SFC verification request information merely includes the SID of the SF node to be verified and does not include the SIDs of the other SF nodes, it may be considered that any SF node corresponding to the included SID is the SF node to be verified.

Figure 2:
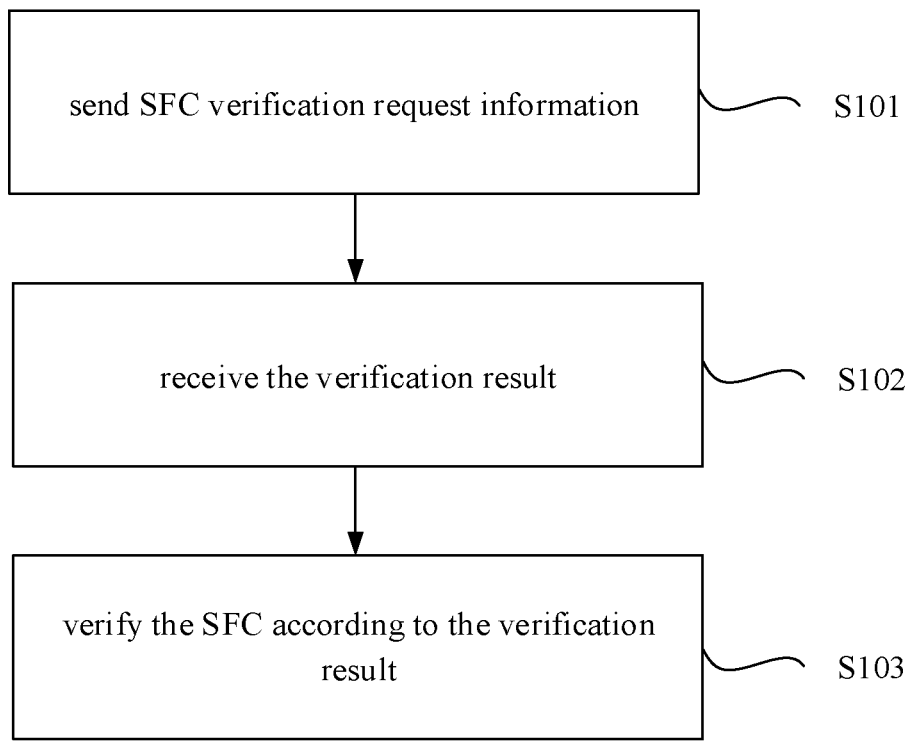
FIG. 2 is another flowchart illustrating the method for verifying an SFC according to an embodiment of the present disclosure.

With reference to FIG. 2, in some embodiments, the check node is the sending node; after the SFC verification request information is sent, the method further includes: S102, receiving the verification result; and S103, verifying the SFC according to the verification result.

When the sending node also serves as the check node, the sending node needs to receive the verification result after sending the SFC verification request information, and complete the verification of the SFC according to specific conditions of the SFC indicated by the verification result.

In some embodiments, the SF node to be verified includes a plurality of SF nodes of the SFC.

In an implementation of the embodiments of the present disclosure, each piece of SFC verification request information may include SIDs of a plurality of SF nodes to be verified, so that the SFC verification request information may sequentially pass through those SF nodes to realize verification of those SF nodes, that is, verification of the plurality of SF nodes may be realized according to one piece of SFC verification request information.

In some embodiments, the SF node to be verified is one SF node of the SFC.

In another implementation of the embodiments of the present disclosure, each piece of SFC verification request information merely includes an SID of one SF node to be verified, so that merely one SF node may be verified according to one piece of SFC verification request information.

In some embodiments, the SFC verification request information further includes identity information configured to indicate the identity of the SFC verification request information, and the identity information includes at least one of: an identifier or an identity SID corresponding to the SID of the SF node to be verified.

The SFC verification request information includes the identity information, so that the SF node and the SFF node may determine whether the information received thereby is the SFC verification request information or other conventional information, and then decide whether to start to perform verification according to the information.

In an implementation of the embodiments of the present disclosure, the identity information may be an identifier.

For example, the identifier may be a special flag bit extended in a FLAG field or a TAG field in the SRH, or a Next Header indicating a packet type.

Or, in another implementation of the embodiments of the present disclosure, the identity information may be a newly added identity SID, which corresponds to an SID of each SF node to be verified, and indicates that the corresponding SF node to be verified needs to be verified.

Illustratively, the identity SID may be defined on the SF node or the SFF node, and may be added to the SFC verification request information, so that the SF node or the SFF node may recognize the identity SID after receiving the SFC verification request information, and enter a special processing procedure.

Illustratively, the identity SID may be a newly added routing prefix, and it is explicitly indicated in local configuration that the identity SID is an SID which needs to be processed in a special way. The identity SID may include, but is not limited to, an SID value, a verification type (such as the path verification or the function verification), and a processing mode (such as entering the special processing procedure).

Or, it may be the case that the identity SID is implemented by the network programming function of the SR, instead of adding the routing prefix on the SF node. For example, the SID is formed from an interface prefix, such as a prefix of a Loopback interface which needs to be advertised to the outside by the SF node, together with a special Function. In such case, the SF node may have a plurality of SID entries that are the same in the Locator but different in the Function. A specifical processing method needs to be adopted by the node: after the node receives the packet and finds a matched local Locator according to the SID, the node needs to further recognize the Function carried by the SID so as to take a corresponding processing action.

Illustratively, the above identity information may indicate that the SFC verification request information is OAM information, and an OAM processing procedure is to be entered. Therefore, the identity information may be an OAM packet identifier.

According to actual needs of operation of a network, management of the network is generally divided into three categories, namely, Operation, Administration, and Maintenance, which are called OAM (Operation Administration and Maintenance) for short. The Operation mainly indicates daily analysis, prediction, planning and configuration of the network and services; and the Maintenance mainly indicates daily operations performed for testing and fault management of the network and the services thereof.

The SFC verification request information may further include other information needed for verification.

For example, the SFC verification request information may further include check node information about the check node, which includes an identifier of the check node (that is, to indicate which node is the check node), and information indicating by which way the verification result is sent to the check node.

As another example, the SFC verification request information may further include verification parameter information for completing the verification, such as the information indicating what verification is to be performed, the information indicating what verification method is to be adopted, and the information to be used in the verification. Illustratively, the verification parameter information may include a test packet configured to test a function of the SF node, an IP packet (such as an Internet Control Message Protocol (ICMP) packet/an Internet Control Message Protocol version 6 (ICMPv6) packet/a User Datagram Protocol (UDP) packet) used for the path verification, etc.

Figure 18:
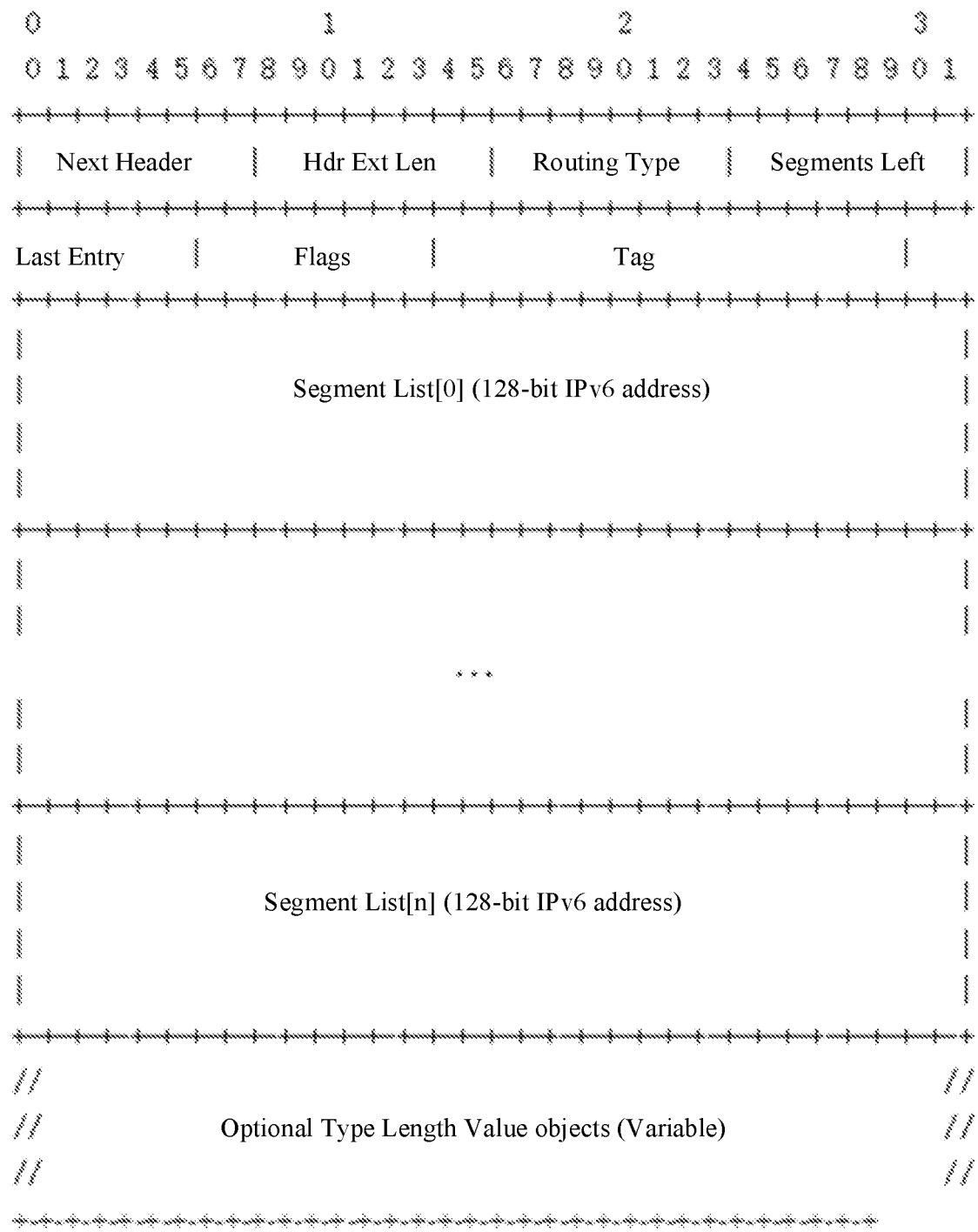
FIG. 18 is a schematic diagram of a structure of SFC verification request information according to an embodiment of the present disclosure.

Illustratively, the above verification parameter information (such as the test packet) may be carried in the SRH, such as in an extended TLV (Optional Type Length Value objects) or a sub-TLV in the SRH. For example, reference may be made to FIG. 18 for an exemplary structure of the SFC verification request information carrying the extended TLV.

Or, the verification parameter information may be carried in an IPv6 extension header, which may be in the form of Destination Options Header, Hop-by-Hop Options Header, or the like, and the IPv6 extension header is encapsulated in the SFC verification request information and located after the SRH, and may be explicitly indicated by a Next Header field.

Or, the verification parameter information may be carried in payload of the SFC verification request information, and the payload is carried after the Segment List, and may be explicitly indicated by the Next Header field.

In some embodiments, the SFC verification request information is path verification request information, and the verification request is configured to request verification of a location of the SF node to be verified and an SF type of the SF node to be verified.

In an implementation of the embodiments of the present disclosure, the SFC verification request information may request verification of the path of the SFC, that is, to verify whether the SF nodes are programmed in an expected order (i.e., an expected SFC). In such case, the verification request in the SFC verification request information requests acquisition of the SF type of the SF node to be verified and the location (i.e., the position in the order) of the SF node to be verified in the SFC, and the location may be represented by the SIDs and a forwarding sequence of the SF node to be verified and a superordinate SFF node connected thereto. Thus, the verification result may indicate what SF, e.g., the FW function or the LB function, is performed by the SF node to be verified in each location in the SFC, so that the verification determines which SF node is in each location in the SFC, that is, the path of the SFC is verified.

The verification result may further include other information useful for the verification, such as identification information of the SF node (e.g., manufacturer information, and instance number, which are configured to distinguish between SF nodes of the same type), and return code information (configured to explain a reason for sending the verification result, such as a normal return, a packet error, or a failure to find a next hop).

Thus, the check node may compare the information of the SF node in the received verification result with the information of the SF node programmed (expected) in the SFC, so as to determine whether each SF node is reachable (if the SF type of the SF node is received, the SF node is necessarily reachable), and whether each SF node is programmed in the expected order.

In some embodiments, the SF node to be verified includes all SF nodes of the SFC.

In an implementation of the embodiments of the present disclosure, all the SF nodes of the SFC may be set as the SF nodes to be verified in one piece of SFC verification request information (resulting in the fact that the SFC verification request information includes SIDs of all the SF nodes), so that the SFC verification request information sequentially passes through all service nodes of the SFC, thereby realizing path verification of the whole SFC.

Figure 3:
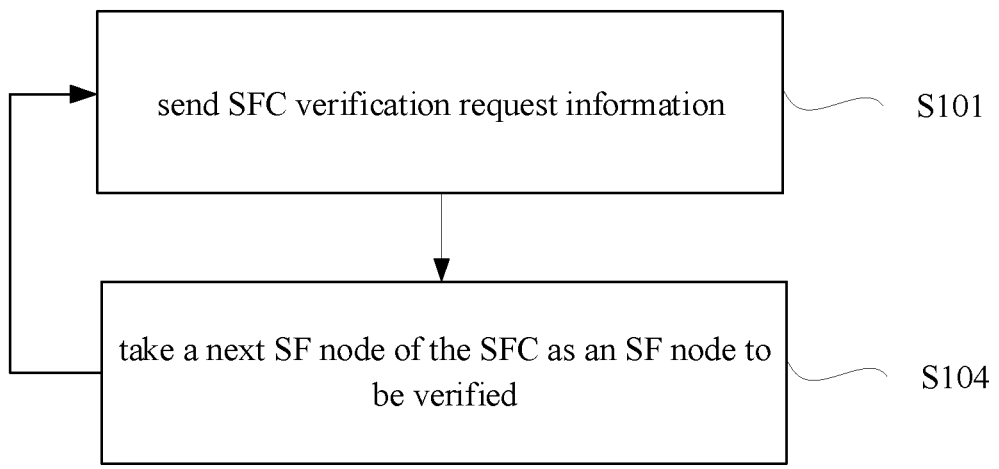
FIG. 3 is still another flowchart illustrating the method for verifying an SFC according to an embodiment of the present disclosure.

With reference to FIG. 3, in some embodiments, the SF node to be verified is one SF node of the SFC; after the SFC verification request information is sent, the method further includes: S104, taking a next SF node of the SFC as an SF node to be verified, and returning to the operation of sending SFC verification request information.

In another implementation of the embodiments of the present disclosure, merely one SF node is set as the SF node to be verified in one piece of SFC verification request information (resulting in the fact that the SFC verification request information merely includes an SID of one SF node to be verified), so that each piece of SFC verification request information is configured to verify merely one SF node to be verified.

In this case, in order to complete the verification of the whole path of the SFC, after each time the SFC verification request information for one SF node to be verified is sent, the sending node may take an SF node in a next hop relative to a previous SF node to be verified as the SF node to be verified, and sends the SFC verification request information again, and so on, until the SFC verification request information for the case where the last SF node of the SFC is taken as the SF node to be verified is sent, thus completing the verification of the whole path of the SFC.

In some embodiments, the SFC verification request information is function verification request information, and the verification request is configured to request verification of normality of an SF of the SF node to be verified.

In another implementation of the embodiments of the present disclosure, the SFC verification request information may also be configured to verify normality of an SF of an SF node, that is, to verify whether the SF node is capable of performing a loaded function normally.

In some embodiments, the SF node to be verified is one SF node of the SFC.

When function verification is performed, a method in which each piece of SFC verification request information includes merely one SF node to be verified may be adopted, because it is hard to transmit all the information used for verifying a plurality of SF nodes with one piece of SFC verification request information due to a large number of specific types involved in the function verification and a large amount of information (e.g., the verification parameter information) needed by the function verification.

Since the function verification does not necessarily request acquisition of the location (the position in the order) of each SF node, it just needs to be ensured in the function verification that each piece of SFC verification request information includes merely one SF node to be verified. When a plurality of SF nodes are to be verified, a plurality of pieces of corresponding SFC verification request information may be sent simultaneously, without waiting for the completion of previous verification for sending a next piece of SFC verification request information.

In a second aspect, an embodiment of the present disclosure provides a method for verifying an SFC, which is applied by an SFF node.

The embodiment of the present disclosure is used for realizing verification of an SFC, and the method provided by the embodiment of the present disclosure can be used for being executed by the SFF node.

It should be understood that, when a certain SFF node executes the method provided by the embodiment of the present disclosure, at least one of subordinate nodes of the SFF node is an SF node to be verified.

Figure 4:
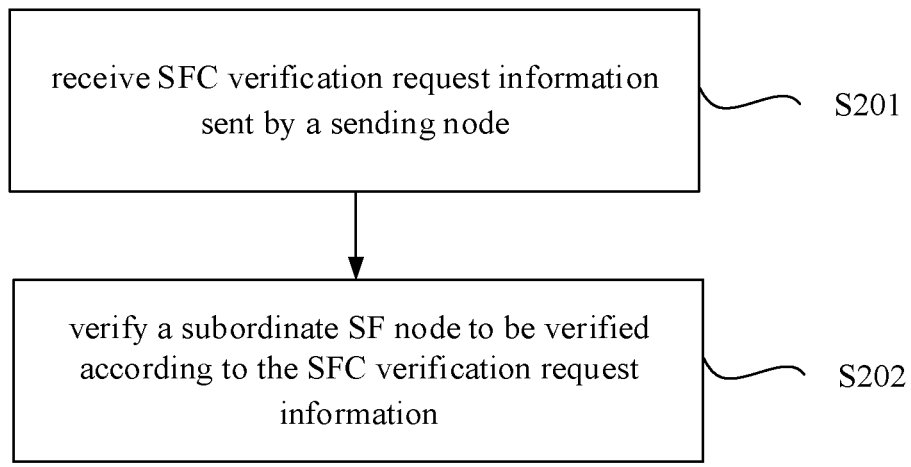
FIG. 4 is a flowchart illustrating another method for verifying an SFC according to an embodiment of the present disclosure.

With reference to FIG. 4, the method provided by the embodiment of the present disclosure includes: S201, receiving SFC verification request information sent by a sending node; and S202, verifying a subordinate SF node to be verified according to the SFC verification request information.

The SFC verification request information is an SR packet, and a Segment List of the SFC verification request information at least includes an SID of the SF node to be verified; the SFC verification request information includes a verification request configured to request a service node of the SFC to verify the SF node to be verified so as to verify the SFC and send a verification result to a check node; and the service node includes an SF node and an SFF node.

In the embodiment of the present disclosure, after receiving the SFC verification request information sent by the sending node, the SFF node may determine that the SF node to be verified includes a subordinate SF node of the SFF node according to the SFC verification request information, so as to verify the SF node to be verified.

Since the SFC verification request information is the SR packet, the contents of the SFC verification request information may have some inevitable change when being transmitted in a network. Therefore, the contents of the SFC verification request information received by the SFF node may not be completely the same as the contents of the SFC verification request information sent by the sending node, but the information received by the SFF node may still be regarded as the SFC verification request information.

For example, when the Segment List of the SFC verification request information includes SIDs of a plurality of service nodes on a path, the SFC verification request information may be subjected to the operation next (next hop) each time the SFC verification request information is forwarded by one service node. For example, for performing the operation next in an SRv6 mode, a pointer (SL) needs to be reduced by 1 and a current Destination Address (DA) needs to be changed; while for performing the operation next in an SR-MPLS mode, a current label needs to be stripped off. Thus, the DA and the pointer, or an outer label stack in the SFC verification request information may be changed when the SFC verification request information is forwarded.

The SFC verification request information may be forwarded for a plurality of times. Since some SFF nodes in the network may not have subordinate SF nodes to be verified, those SFF nodes may just forward the SFC verification request information in a conventional way without performing verification. Or, some SFF nodes may need to further forward the SFC verification request information to subsequent SFF nodes in a conventional way after verifying subordinate SF nodes with the method provided by the embodiment of the present disclosure.

In some embodiments, after the subordinate SF node to be verified is verified, the method further includes: sending the verification result to the check node.

In an implementation of the embodiments of the present disclosure, after the SFF node verifies the subordinate SF node to be verified, the SFF node may send the verification result to the check node by itself.

As stated above, the check node may be in various forms, and the SFF node (or SF node) may send the verification result to the check node in various ways.

For example, the verification result may be an SR packet, or a packet in another form, such as an ICMP packet, an ICMPv6 packet, or a UDP packet.

For example, if the check node is a node in the forwarding plane, a DA of the check node may be determined according to a source address in the SFC verification request information; and if the check node is a node in the control plane (e.g., the SDN controller), the verification result may be uploaded through a control channel using a protocol such as the Network Configuration Protocol (the netconf Protocol).

In some embodiments, the SFC verification request information is path verification request information, and the verification request is configured to request verification of a location of the SF node to be verified and an SF type of the SF node to be verified; and verifying the subordinate SF node to be verified (S202) includes: S2021, searching a local pre-stored information table for the location and the SF type of the subordinate SF node to be verified according to the SF node to be verified in the SFC verification request information; and S2022, obtaining the verification result according to the location and the SF type of the SF node to be verified, and sending the verification result to the check node.

In an implementation of the embodiments of the present disclosure, in path verification, an information table, which stores related information (at least including an SF type and a location) of each SF node, may be preset in the SFF node (for example, the information table is added to a forwarding table, or an attribute table associated with the forwarding table is added), so that the SFF node may directly find the information corresponding to the subordinate SF node to be verified of the SFF node in the information table, obtain the verification result according to the found information, and send the verification result to the check node.

Thus, the verification is performed by the SFF node itself, that is, no information needs to be sent to the SF node in the verification process.

In some embodiments, verifying the subordinate SF node to be verified (S202) includes: S2023, sending verification information to the subordinate SF node to be verified according to the SF node to be verified in the SFC verification request information.

In another implementation of the embodiments of the present disclosure, the SFF node may send the information used for verifying the subordinate SF node to be verified to the subordinate SF node to be verified, so that the verification is performed through interaction between the SFF node and the SF node.

The verification information refers to the information used by the SF node to be verified to complete the verification, and a specific form of the verification information may vary according to different verification methods and different conditions of the SF node to be verified.

In some embodiments, sending the verification information to the subordinate SF node to be verified (S2023) includes: forwarding the SFC verification request information to the subordinate SF node to be verified as the verification information.

In an implementation of the embodiments of the present disclosure, when the SF node to be verified has the capability of processing the SFC verification request information, the SFF node may directly forward the SFC verification request information to the subordinate SF node to be verified to allow the SF node to be verified to perform verification according to the SFC verification request information.

For example, the SF node to be verified may identify that verification is requested after receiving the SFC verification request information, accordingly perform verification on itself (such as obtaining its own SF type or verifying whether its SF is normal), and then send verification feedback information to the SFF node, or send the verification result to the check node (including direct sending, or forwarding by the SFF node).

In some embodiments, sending the verification information to the subordinate SF node to be verified (S2023) includes: generating the verification information according to the SFC verification request information, and sending the verification information to the subordinate SF node to be verified.

In another implementation of the embodiments of the present disclosure, when the SF node to be verified does not have the capability of processing the SFC verification request information, the SFF node needs to generate, according to the SFC verification request information, the information which is capable of being processed by the SF node to be verified, and the information which is capable of being processed by the SF node to be verified is the verification information.

For example, in function verification, the SFF node may extract a test packet from the SFC verification request information as the verification information, and send the verification information to the SF node to be verified, and the test packet is a packet to be directly processed by an SF of the SF node.

For example, in a case where the SF of the SF node to be verified is the FW function configured to filter packets according to a filtering rule, the test packet may include a packet within a range of the filtering rule and a packet out of the range of the filtering rule, so that the SFF node may determine whether the FW function operates normally according to whether the SFF node receives a packet sent back by the SF node to be verified within a predetermined period after the test packet is sent to the SF node to be verified.

Figure 5:
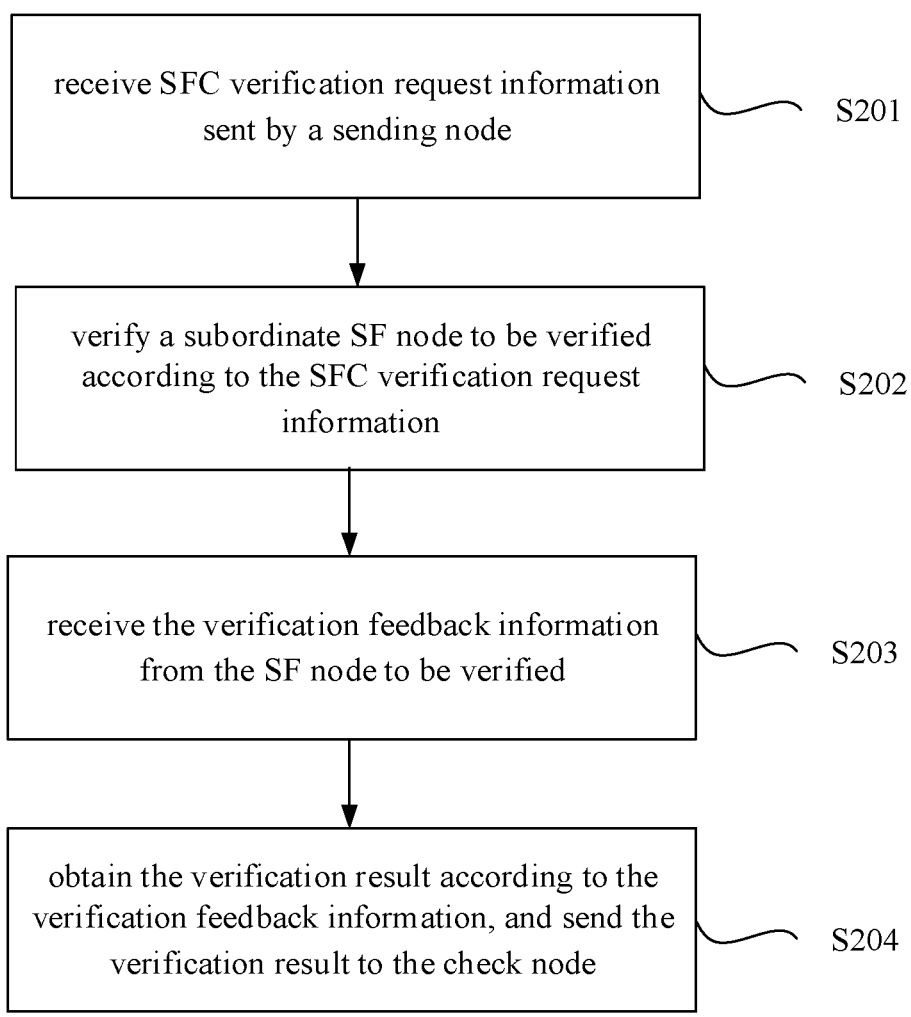
FIG. 5 is another flowchart illustrating the another method for verifying an SFC according to an embodiment of the present disclosure.

With reference to FIG. 5, in some embodiments, after the verification information is sent to the subordinate SF node to be verified (S202), the method further includes: S203, receiving the verification feedback information from the SF node to be verified; and S204, obtaining the verification result according to the verification feedback information, and sending the verification result to the check node.

As stated above, after the SFF node sends the verification information to the subordinate SF node to be verified, it may be the case that the SF node to be verified completes verification by itself, and sends the verification result to the check node (including forwarding by the SFF node). It may also be the case that the SF node to be verified cannot directly obtain the verification result for the check node, so that the SF node to be verified sends the information related to the verification result (the verification feedback information) to the SFF node, and then the SFF node obtains the formal verification result according to the verification feedback information and sends the formal verification result to the check node.

For example, in a case where the SFF node determines whether the FW function is normal according to the packet sent back by the SF node to be verified, the SFF node may send a result of whether the FW function is normal to the check node as the verification result, instead of directly sending the packet sent back by the SF node to be verified to the check node.

In a third aspect, an embodiment of the present disclosure provides a method for verifying an SFC, which is applied by an SF node.

The embodiment of the present disclosure is used for realizing verification of an SFC, and the method provided by the embodiment of the present disclosure can be used for being executed by the SF node.

It should be understood that, when a certain SF node executes the method provided by the embodiment of the present disclosure, the SF node is an SF node to be verified.

Figure 6:
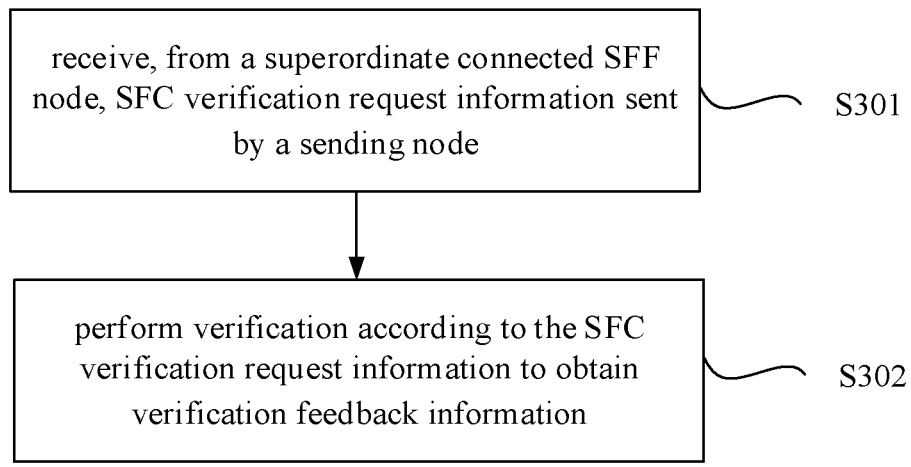
FIG. 6 is a flowchart illustrating still another method for verifying an SFC according to an embodiment of the present disclosure.

With reference to FIG. 6, the method provided by the embodiment of the present disclosure includes: S301, receiving, from a superordinate connected SFF node, SFC verification request information sent by a sending node; and S302, performing verification according to the SFC verification request information to obtain verification feedback information.

The SFC verification request information is an SR packet, and a Segment List of the SFC verification request information at least includes an SID of the SF node to be verified; the SFC verification request information includes a verification request configured to request a service node of the SFC to verify the SF node to be verified so as to verify the SFC and send a verification result to a check node; and the service node includes an SF node and an SFF node.

When a certain SF node is the SF node to be verified, the SF node may receive, from a superordinate connected SFF node, the SFC verification request information sent by the sending node, and perform verification on itself according to the SFC verification request information to obtain the verification feedback information related to the verification result.

As stated above, in such case, the contents of the SFC verification request information received by the SF node may not be completely the same as the contents of the SFC verification request information sent by the sending node, but the received SFC verification request information is still regarded as the SFC verification request information.

Figure 7:
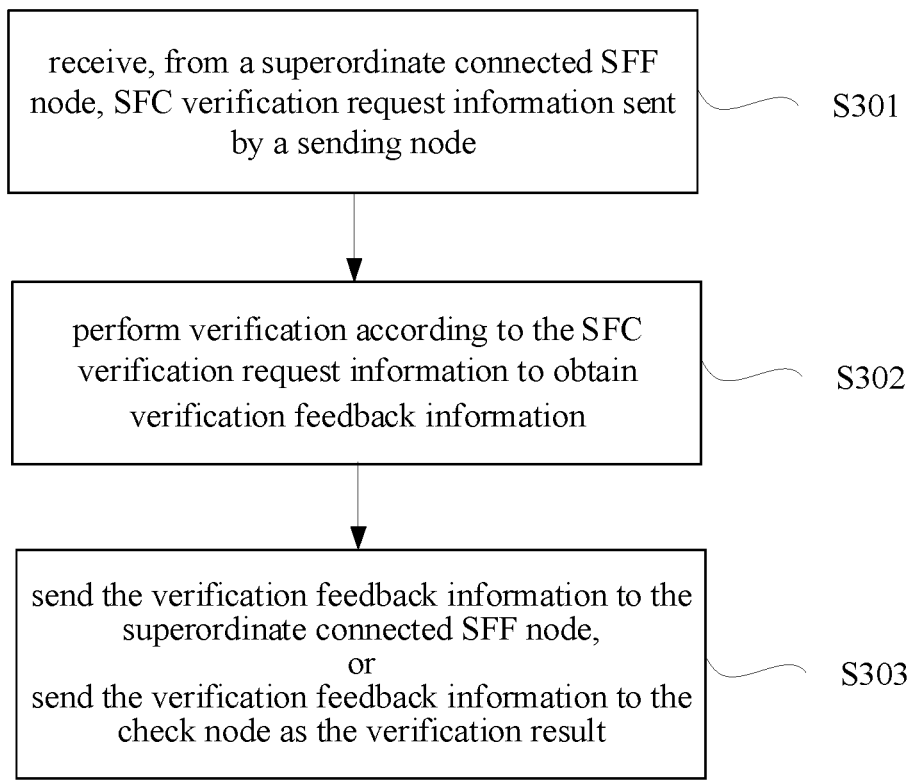
FIG. 7 is another flowchart illustrating the still another method for verifying an SFC according to an embodiment of the present disclosure.

With reference to FIG. 7, in some embodiments, after verification is performed according to the SFC verification request information to obtain the verification feedback information (S302), the method further includes: S303, sending the verification feedback information to the superordinate connected SFF node.

As stated above, in an implementation of the embodiments of the present disclosure, after obtaining the verification feedback information, the SF node may send the verification feedback information to the superordinate connected SFF node, and the SFF node obtains the verification result according to the verification feedback information and sends the verification result to the check node.

Or, with reference to FIG. 7, in some embodiments, after verification is performed according to the SFC verification request information to obtain the verification feedback information (S302), the method further includes: S303, sending the verification feedback information to the check node as the verification result.

As stated above, in another implementation of the embodiments of the present disclosure, the SF node may also take the verification feedback information as the verification result, and send the verification feedback information to the check node by itself (including forwarding by the SFF node).

Figure 8:
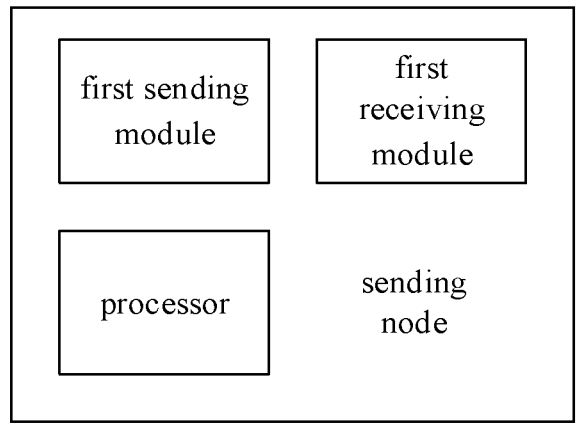
FIG. 8 is a block diagram of a sending node according to an embodiment of the present disclosure.

In a fourth aspect, with reference to FIG. 8, an embodiment of the present disclosure provides a sending node for implementing the above method, which includes: a first sending module configured to send SFC verification request information. The SFC verification request information is an SR packet, and a Segment List of the SFC verification request information at least includes an SID of an SF node to be verified; the SFC verification request information includes a verification request configured to request a service node of an SFC to verify the SF node to be verified so as to verify the SFC and send a verification result to a check node; and the service node includes an SF node and an SFF node.

In some embodiments, the sending node further includes: a first receiving module configured to receive the verification result; and at least one processor configured to verify the SFC according to the verification result.

Figure 9:
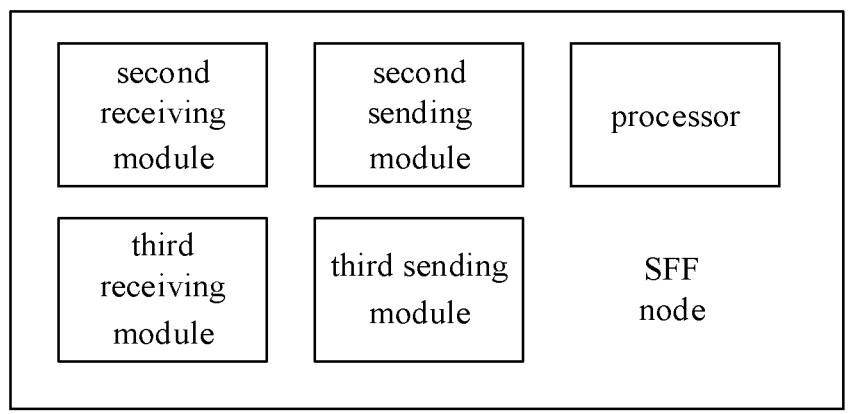
FIG. 9 is a block diagram of a Service Function Forwarder (SFF) node according to an embodiment of the present disclosure.

In a fifth aspect, with reference to FIG. 9, an embodiment of the present disclosure provides an SFF node for implementing the above method, which includes: a second receiving module configured to receive SFC verification request information sent by a sending node; and at least one processor configured to verify a subordinate SF node to be verified according to the SFC verification request information. The SFC verification request information is an SR packet, and a Segment List of the SFC verification request information at least includes an SID of the SF node to be verified; the SFC verification request information includes a verification request configured to request a service node of an SFC to verify the SF node to be verified so as to verify the SFC and send a verification result to a check node; and the service node includes an SF node and an SFF node.

In some embodiments, the SFF node further includes: a second sending module configured to send the verification result to the check node.

In some embodiments, the SFF node further includes: a third sending module configured to send verification information to the subordinate SF node to be verified according to the SF node to be verified in the SFC verification request information.

In some embodiments, the SFF node further includes: a third receiving module configured to receive verification feedback information from the SF node to be verified; and the processor is further configured to obtain the verification result according to the verification feedback information, and send the verification result to the check node.

Figure 10:
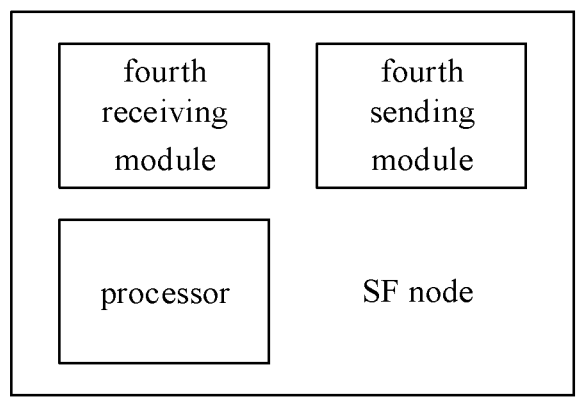
FIG. 10 is a block diagram of an SF node according to an embodiment of the present disclosure.

In a sixth aspect, with reference to FIG. 10, an embodiment of the present disclosure provides an SF node for implementing the above method, which includes: a fourth receiving module configured to receive, from a superordinate connected SFF node, SFC verification request information sent by a sending node; and at least one processor configured to perform verification according to the SFC verification request information to obtain verification feedback information. The SFC verification request information is an SR packet, and a Segment List of the SFC verification request information at least includes an SID of an SF node to be verified; the SFC verification request information includes a verification request configured to request a service node of an SFC to verify the SF node to be verified so as to verify the SFC and send a verification result to a check node; and the service node includes an SF node and an SFF node.

In some embodiments, the SF node further includes: a fourth sending module, which is configured to send the verification feedback information to the superordinate connected SFF node, or to send the verification feedback information to the check node as the verification result.

First Exemplary Embodiment

The method for verifying an SFC according to the present exemplary embodiment may include the following operations A101 to A103.

In A101, the sending node constructs and sends the SFC verification request information.

The sending node firstly obtains the SIDs of the service nodes (the SFF nodes and the SF nodes) of the SFC to be verified, so as to determine the SF node to be verified.

Illustratively, the SIDs of the service nodes of the SFC to be verified may be obtained locally, or may be configured by the control plane.

The sending node needs to add the identity information (the identity SID and the identifier) to the SFC verification request information to indicate the identity of the SFC verification request information.

The sending node also needs to add the check node information and the verification parameter information to the SFC verification request information.

The ways of carrying the identity information, the check node information, and the verification parameter information in the SFC verification request information may be the same as those described above, and thus are not repeated here.

In A102, a corresponding service node of the SFC recognizes the SFC verification request information, performs corresponding processing (such as forwarding and verification), generates the verification result, and sends the verification result to the check node.

The operations performed by each service node after receiving one piece of the information may include operations (1) to (3).

Operation (1): the service node determines whether a current SID (DA) in the information is a local SID, forwards the information to the DA if the current SID in the information is not the local SID, and performs the next operation if the current SID in the information is the local SID.

Operation (2): the service node determines whether the current SID is the identity SID (such as an SID indicating that the packet is the OAM packet), determines, if the current SID is the identity SID, that the SFC verification request information is the SFC verification request information used for verifying an SF node corresponding to the local SID and accordingly enters a verification procedure, and performs the next operation if the current SID is not the identity SID.

Operation (3): the service node determines whether the information includes the identifier, determines, if the information includes the identifier, that the SFC verification request information is the SFC verification request information used for verifying the SF node corresponding to the local SID and accordingly enters the verification procedure, and processes the information as a conventional packet if the information does not include the identifier.

Apparently, the operations (2) and (3) are both for determining whether the information is the SFC verification request information for the local SID, so that the order of the operations (2) and (3) may be reversed. Or merely one of the operations (2) and (3) is performed according to a possible condition of the SFC verification request information.

In A103, the check node verifies the SFC according to the received verification result.

After receiving the verification result, the check node may verify the SFC according to the verification result.

For example, for performing the path verification, the check node may compare the order (the locations) and the SF types of the SF nodes to be verified in the received verification result with corresponding information of the expected SFC, so as to determine the correctness of the path of the expected SFC.

For example, for performing the function verification, the check node may determine whether the functions of the SFC are normal according to a conclusion on whether the SFs of the SF nodes to be verified are normal derived from the verification result.

Apparently, if the verification result for a certain SF node to be verified is not received over the predetermined period, it may be determined that such SF node to be verified has a problem (for example, it is determined that such SF node to be verified is not reachable).

Second Exemplary Embodiment

The present exemplary embodiment is used for the path verification of the SFC, for example, the path verification is realized through the interaction between the SF node and the SFF node.

With reference to FIG. 11, the sending node in the network according to the present exemplary embodiment is connected to a first SFF node (SFF1), and the SFF1 is connected to a second SFF node (SFF2); the SFF1 has a first subordinate SF node (SF1) and a second subordinate SF node (SF2), and the SFF2 has a third subordinate SF node (SF3); meanwhile, both the SFF1 and the SFF2 are connected to the check node.

It should be understood that the sending node and the check node are just logically regarded as two different nodes for the description of the present exemplary embodiment, but in fact, the two nodes may be one node in terms of entity.

In the present exemplary embodiment, description is given by taking a case where the SFC to be verified is SF1→SF2→SF3 as an example.

Figure 12:
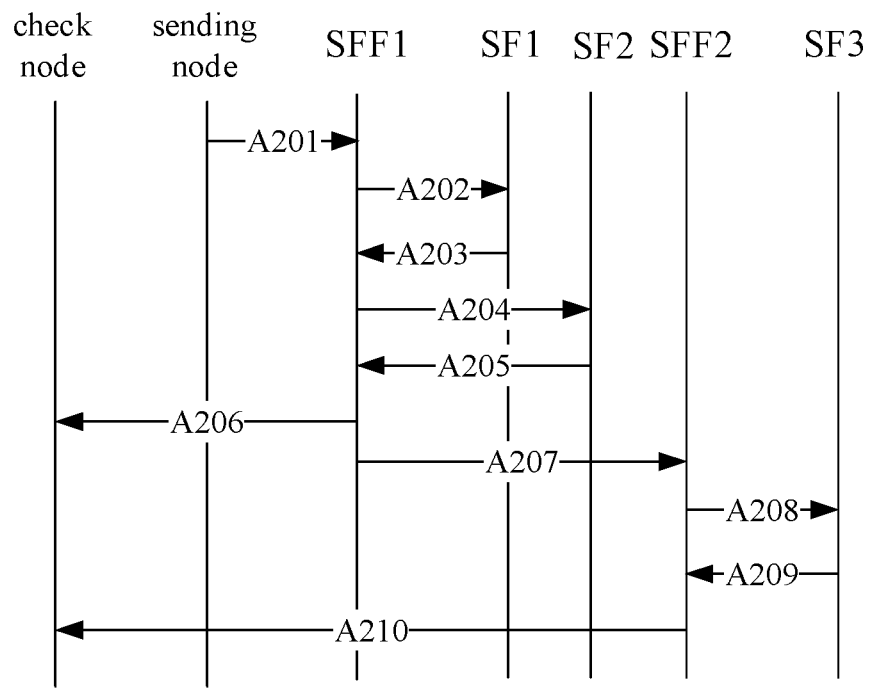
FIG. 12 is an information flow diagram in a method for verifying an SFC according to an embodiment of the present disclosure.

With reference to FIG. 12, the method for verifying an SFC according to the present exemplary embodiment may include the following operations A201 to A210.

In A201, the sending node constructs and sends the SFC verification request information.

Thus, the SFC verification request information may include:

<S, SFF1><SFF1, SF1, SF2, SFF3, SF2; SL=4; NH=SFC INFO><SFC INFO>;

where S represents the SID of the sending node, the other "SF"s or "SFF"s represent the SIDs of the corresponding service nodes, SL is the pointer, SFC INFO represents the verification parameter information, and the specific contents of SFC INFO are the packet carried after the SRH.

Figure 19:
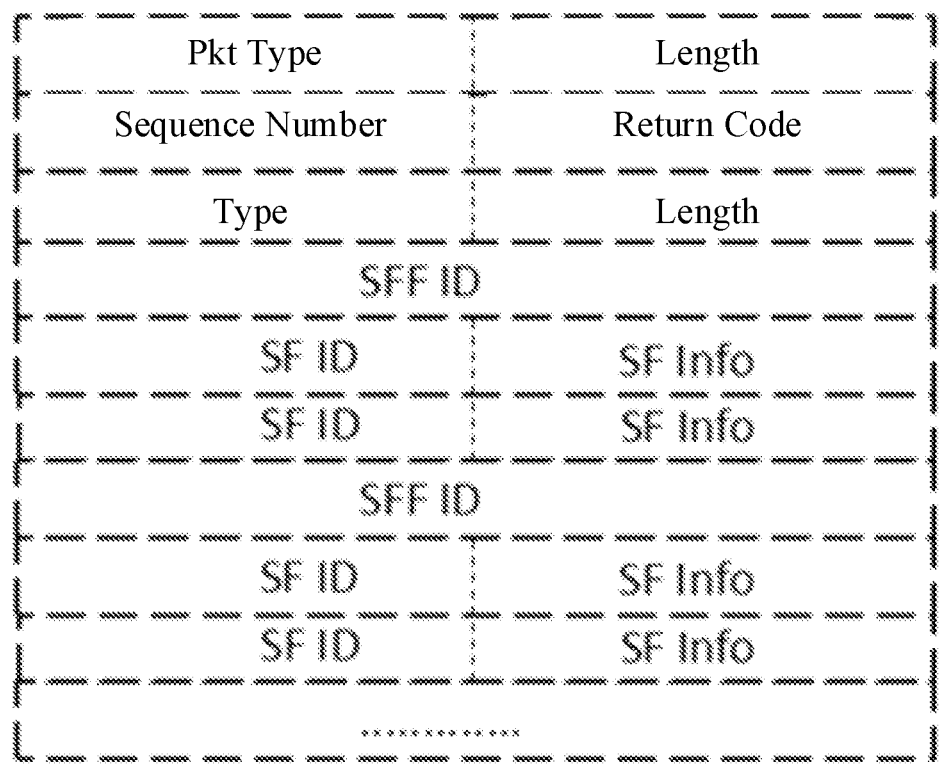
FIG. 19 is a schematic diagram of a structure of an SFC INFO packet according to an embodiment of the present disclosure.

Illustratively, reference may be made to FIG. 19 for a structure of the SFC INFO packet, where Pkt Type represents a packet type, Return Code represents a way of returning the verification result, and the detailed information of the SFC and the SID of each SF node are records of a parent node.

Or, the SFC verification request information may include:

<S, SFF1><SFF1, END.OAMP, SF1, END.OAMP, SF2, SFF2, END.OAMP, SF3; SL=7; TLV=SFC INFO>;

where END.OAMP represents the identity SID, and the verification parameter information (SFC INFO) is carried in the TLV.

The description below is given by taking a case where the SFC verification request information is in the first above-mentioned form as an example.

In A202, after receiving the SFC verification request information, the SFF1 finds that the DA is the local SID, executes the operation next to update the packet header (stripping off the current label in the SR-MPLS mode, or replacing the DA and reducing the pointer by 1 in the SRv6 mode), searches a local forwarding table, and sends the SFC verification request information from a port/link connected to the SF1.

The SFC verification request information forwarded by the SFF1 to the SF1 may include:

<S, SF1><SFF1, SF1, SF2, SFF2, SF3; SL=3; NH=SFC INFO><SFC INFO>.

In A203, after receiving the SFC verification request information, the SF1 recognizes that the SFC verification request information is the path verification request information (such as recognizing according to NH=SFC INFO), enters the OAM processing procedure, adds information (SF1_info), such as its own SID (which is a part of the location information of the SF1) and its own SF type, to the SFC verification request information, executes the operation next, and returns the path verification request information back to the SFF1 by the same way the path verification request information is sent to the SF1.

The SFC verification request information returned by the SF1 to the SFF1 may include:

<S, SF2><SFF1, SF1, SF2, SFF2, SF3; SL=2; NH=SFC INFO><SFC INFO: SF1_info>.

The contents of the SRH indicate the location of the SF1, which will not be described in detail later.

In A204, after receiving the SFC verification request information returned by the SF1, the SFF1 finds that the DA is the SID of the SF2 after searching the forwarding table, and forwards the SFC verification request information to the SF2.

The SFC verification request information forwarded by the SFF1 to the SF2 may include:

<S, SF2><SFF1, SF1, SF2, SFF2, SF3; SL=2; NH=SFC INFO><SFC INFO: SF1_info>.

In A205, after receiving the SFC verification request information, the SF2 recognizes that the SFC verification request information is the path verification request information, enters the OAM processing procedure, adds information (SF2_info), such as its own SID and its own SF type, to the SFC verification request information, executes the operation next, and returns the path verification request information to the SFF1 by the same way the path verification request information is sent to the SF2.

The SFC verification request information returned by the SF2 to the SFF1 may include:

<S, SFF2><SFF1, SF1, SF2, SFF2, SF3; SL=1; NH=SFC INFO><SFC INFO: SF1_info, SF2_info>.

In A206, after receiving the path verification request information returned by the SF2, the SFF1 finds that the next hop is not a local SID after searching the forwarding table, and thus constructs the verification result, and sends the verification result to the check node.

The verification result includes the information of the current node (SFF1_info) and the above-mentioned information of the SF1 and the SF2, and is capable of indicating the order of the SF1 and the SF2 in the SFC.

The verification result may further include a return code configured to indicate a returning reason, which will not be described in detail here.

The verification result may further include an identifier corresponding to the SFC verification request information, and the identifier is configured to indicate to which SFC verification request information each verification result is corresponding in a case where a plurality of verification results exist.

Illustratively, the verification result may be encapsulated in an ICMP packet, and carries the SRH of the original path verification request information, and the ICMP packet may include:

<SFF1, R> ICMPV6<SFF1, SF1, SF2, SFF2, SF3; SL=1; NH=SFC INFO><SFC INFO: SF1_info, SF2_info, SFF1_info>;

where R represents the SID of the check node.

In A207, the SFF1 also finds that the next hop of the path verification request information is the SFF2, so the SFF1 searches the forwarding table, and continues to send the path verification request information from a port/link connected to the SFF2.

The SFC verification request information forwarded by the SFF1 to the SFF2 may include:

<S, SFF2><SFF1, SF1, SF2, SFF2, SF3; SL=1; NH=SFC INFO><SFC INFO: SF1_info, SF2_info, SFF1_info>.

In A208, like the above operations, the SFF2 sends the path verification request information to the SF3.

The path verification request information forwarded by the SFF2 to the SF3 may include:

<S, SF3><SFF1, SF1, SF2, SFF2, SF3; SL=1; NH=SFC INFO><SFC INFO: SF1_info, SF2_info, SFF1_info>.

In A209, like the above operations, the SF3 adds information (SF3_info) such as its own SF type to the path verification request information, and returns the path verification request information to the SFF2 by the same way the path verification request information is sent to the SF3.

The path verification request information returned by the SF3 to the SFF2 may include:
<S, SFF2><SFF1, SF1, SF2, SFF2, SF3; SL=1; NH=SFC INFO><SFC INFO: SF1_info, SF2_info, SFF1_info; SF3_info>.

In A210, like the above operations, the SFF2 adds its own information (SFF2_info) to the verification result, and sends the verification result to the check node.

The verification result sent to the check node by the SFF2 may include:
<SFF2, R> ICMPV6<SFF1, SF1, SF2, SFF2, SF3; SL=0; NH=SFC INFO><SFC INFO: SF1_info, SF2_info, SFF1_info; SF3_info, SFF2_info>.

The SFF2 stops forwarding the path verification request information since there is not a next entry in the Segment List.

Third Exemplary Embodiment

The present exemplary embodiment is used for the path verification of the SFC, for example, the path verification is realized through the information pre-stored in the SFF node.

With reference to FIG. 11, the network in the present exemplary embodiment is similar to the networks described in the above exemplary embodiments.

In the present exemplary embodiment, description is given by taking a case where the SFC to be verified is SF1→SF2→SF3 as an example.

Figure 13:
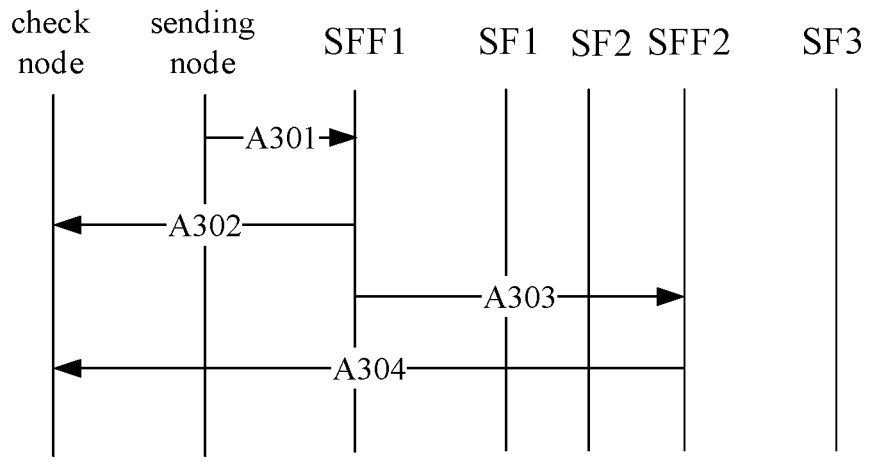
FIG. 13 is another information flow diagram in a method for verifying an SFC according to an embodiment of the present disclosure.

With reference to FIG. 13, the method for verifying an SFC according to the present exemplary embodiment may include the following operations A301 to A304.

In A301, the sending node constructs and sends the SFC verification request information.

In A302, after receiving the SFC verification request information, the SFF1 recognizes that the SFC verification request information is the SFC verification request information, searches the local pre-stored information table (for example, the information table is added to the forwarding table, or an attribute table associated with the forwarding table is added) for the location and the SF type of the SF1, adds the location and the SF type of the SF1 to the SFC verification request information, and then executes the operation next to update the packet header; and the SFF1 repeats the above processes to add the location and the SF type of the SF2 to the SFC verification request information, constructs the verification result when finding that there is no local SID to be processed, and sends the verification result to the check node.

In A303, the SFF1 finds that the next hop of the path verification request information is the SFF2, so the SFF1 searches the forwarding table, and continues to send the path verification request information from the port/link connected to the SFF2.

In A304, after receiving the SFC verification request information, the SFF2 processes the SFC verification request information in a way similar to that in A302 to add the information of the SF3 (the location and the SF type) to the path verification request information, and then constructs and sends the verification result to the check node.

Fourth Exemplary Embodiment

In the present exemplary embodiment, each piece of SFC verification request information merely includes an SID of one SF node to be verified, so that the verification of the whole SFC is completed by sending the SFC verification request information for a plurality of times.

With reference to FIG. 11, the network in the present exemplary embodiment is similar to the networks described in the above exemplary embodiments.

In the present exemplary embodiment, description is given by taking a case where the SFC to be verified is SF1→SF2→SF3 as an example.

Figure 14:
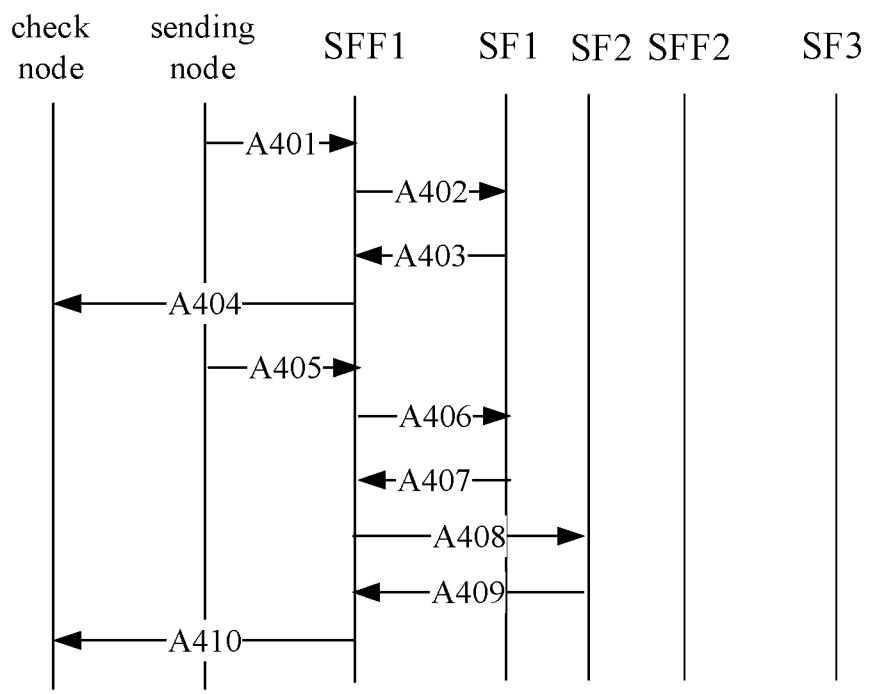
FIG. 14 is still another information flow diagram in a method for verifying an SFC according to an embodiment of the present disclosure.
Figure 14:
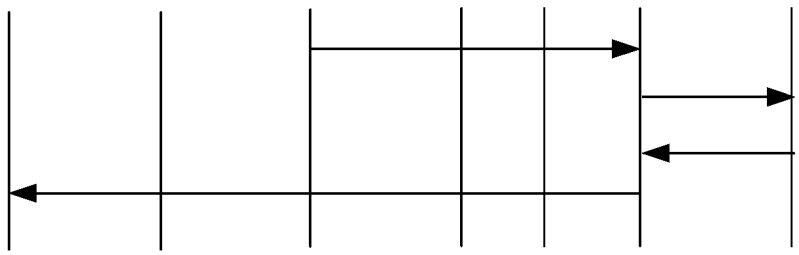

With reference to FIG. 14, the method for verifying an SFC according to the present exemplary embodiment may include the following operations A401 to A410.

In A401, the sending node constructs and sends the SFC verification request information.

The Segment List of the SFC verification request information may include the SIDs of all the service nodes of the SFC, or may merely include the SIDs of the service nodes from the sending node to the current SF node to be verified. However, no matter which SIDs are specifically included, merely one SF node is the SF node to be verified.

The parameter HOP count may be set in the SFC verification request information to determine that by which hop the current SF node to be verified is reached (which hop is the current SF node to be verified). Therefore, the HOP count is set to 1 in this step.

In A402, after receiving the SFC verification request information, the SFF1 searches the forwarding table, and forwards the SFC verification request information to the SF1 according to a normal SR forwarding flow.

In A403, the SF1 recognizes the SFC verification request information, adds the information such as its own location and its own SF type to the SFC verification request information, reduces the HOP count by 1 (which may also be performed by the SFF1), and then returns the SFC verification request information to the SFF1.

In A404, when the SFF1 determines that the Hop count is 0, the SFF1 constructs the verification result according to the SFC verification request information and sends the verification result to the check node.

In A405, after the check node receives the first verification result, the sending node sends the second piece of SFC verification request information, in which the HOP count is set to 2.

The sending node is capable of knowing that the check node has obtained the verification result, for example, the sending node also serves as the check node.

In A406, the SFF1 receives the SFC verification request information and forwards the SFC verification request information to the SF1.

In A407, the SF1 determines that the SFC verification request information is not for itself after finding that the HOP count is 2, reduces the HOP count by 1, and returns the SFC verification request information (or the SF1 may also add the information such as its own SF type to the SFC verification request information).

The operations A408 to A410 are similar to the operations A402 to A404: the SFF1 sends the SFC verification request information to the SF2, SF2 adds the information such as its own location and its own SF type to the SFC verification request information, reduces the HOP count by 1, and then returns the SFC verification request information to the SFF1, and the SFF1 constructs the verification result according to the SFC verification request information when determining that the HOP count is 0, and sends the verification result to the check node.

The subsequent operations are similar to the previous operations: the sending node adds 1 to the HOP count (that is, to set the HOP count to 3), and then sends the SFC verification request information for the third time; the SFC verification request information is sent to the SFF2 after sequentially passing through the SFF1, the SF1, the SFF1, the SF2 and the SFF1, and the HOP count is reduced to 1. Thus, the SFF2 interacts with the SF3 to complete the verification of the SF3, and the verification result is fed back for the third time.

In summary, the HOP count is added by 1 each time the SFC verification request information is sent by the sending node; the SFF nodes construct the verification results when the HOP count is 0, and just forward the SFC verification request information when the HOP count is not 0; the SF nodes reduce the HOP count in the SFC verification request information passed therethrough by 1 and returns the SFC verification request information, and at least adds the information such as their own locations and their own SF types to the SFC verification request information when the HOP count is 1 (or when the HOP count is equal to another value). Thus, it may be ensured that the SF node verified in each verification process is the SF node in the next hop relative to the previously verified SF node.

Figure 15:
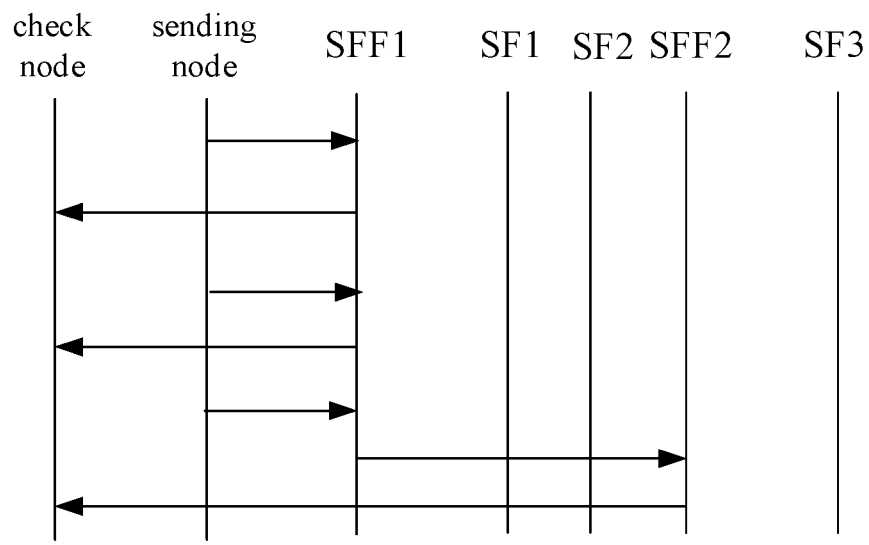
FIG. 15 is yet another information flow diagram in a method for verifying an SFC according to an embodiment of the present disclosure.

Apparently, with reference to FIG. 15, the present exemplary embodiment may also adopt a way of completing the verification by the SFF node itself (for example, when the path verification is performed), and such way is different from the above way in that the SFF node changes the HOP count by itself and obtains the verification result, with no need to send the SFC verification request information to the SF node, which will not be described in detail here.

Fifth Exemplary Embodiment

The present exemplary embodiment is used to verify whether the SF of the SF node is normal. It is hard to verify a plurality of SF nodes by sending just one piece of SFC verification request information due to a large number SF types involved and large differences between processing processes needed in the verification. Therefore, the present exemplary embodiment adopts a way in which each piece of SFC verification request information includes an SID of merely one SF node to be verified.

With reference to FIG. 11, the network in the present exemplary embodiment is similar to the networks described in the above exemplary embodiments.

In the present exemplary embodiment, merely the verification of the SF3 is described as an example, and it may also be regarded that the SFC merely includes the SF3, or merely the SF3 is the SF node to be verified.

Figure 16:
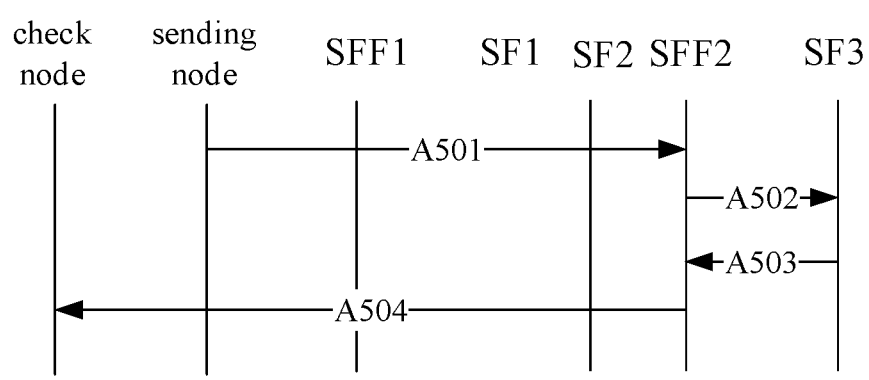
FIG. 16 is yet another information flow diagram in a method for verifying an SFC according to an embodiment of the present disclosure.

With reference to FIG. 16, the method for verifying an SFC according to the present exemplary embodiment may include the following operations A501 to A504.

In A501, the sending node constructs and sends the SFC verification request information.

Since the SFC merely includes the SF3, the SFC verification request information merely includes the SIDs of the SFF2 and the SF3.

In A502, the SFF2 receives the SFC verification request information and recognizes the identity of the SFC verification request information, and sends the verification information to the SF3.

When the SF3 has the capability of directly processing the SFC verification request information (for example, the SF3 has an additional OAM function), the SFF2 may directly forward the SFC verification request information to the SF3, that is, the verification information is the SFC verification request information.

When the SF3 does not have the capability of directly processing the SFC verification request information, the SFF2 needs to generate the test packet capable of being directly processed by the SF3, and send the test packet to the SF3 for being processed, that is, the verification information is the test packet.

For example, the SF2 may extract the test packet from the SFC verification request information, add an outer package (e.g., a vlan tag and a vxlan header) to the test packet, and send the test packet to the SF3.

Figure 20:
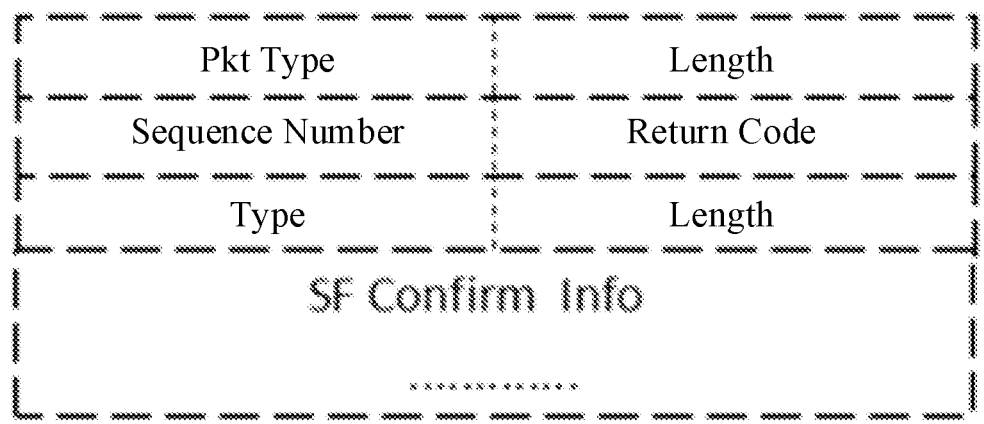
FIG. 20 is a schematic diagram of a structure of an SFC INFO packet carrying a test packet according to an embodiment of the present disclosure.

Being the verification parameter information, the test packet may be added to the above SFC INFO, and reference may be made to FIG. 20 for a structure of the SFC INFO packet carrying the test packet (SF Confirm Info).

A specific form of the test packet may vary according to different SFs to be verified.

For example, if the SF of the SF3 is a Network Address Translation (NAT) function, a source IP, a source port, a destination IP, and a destination port may be carried in the test packet.

As another example, if the SF of the SF3 is the FW function configured with the filtering rule, the test packet may include the packet within the range of the filtering rule and the packets out of the range of the filtering rule.

As another example, the test packet may also be a special packet agreed with the SF3, and after receiving the special packet, the SF3 returns a description of whether the SF operates normally according to a current condition.

In A503, the SF3 generates the verification feedback information according to the verification information, and sends the verification feedback information to the SFF2.

When the SF3 has the capability of directly processing the SFC verification request information, the SF3 may directly add the description of whether its own SF is normal to the SFC verification request information, and return the SFC verification request information to the SFF2, that is, the verification feedback information is the SFC verification request information.

When the SF3 does not have the capability of directly processing the SFC verification request information, the SF3 may process the test packet according to its own SF, that is, the SF3 may process the test packet as a normal packet according to its own SF (e.g., the NAT function or the FW function), and send the verification feedback information to the SFF2.

In A504, the SFF2 constructs the verification result according to the verification feedback information, and sends the verification result to the check node.

When the SF3 has the capability of directly processing the SFC verification request information, the SFF2 may acquire the normality of the SF3 from the SFC verification request information sent by the SF3, and construct the verification result.

When the SF3 does not have the capability of directly processing the SFC verification request information, the SFF2 may analyze the feedback of the SF3 on the test packet to determine the normality of the SF3, and construct the verification result.

For example, when the SF of the SF3 is the NAT function, the SFF2 may determine whether the NAT function is normal according to whether the IP/port in the packet returned by the SF3 is converted to a correct value.

As another example, when the SF of the SF3 is the FW function, the SFF2 may determine whether the FW function is normal according to whether a packet out of the range of the filtering rule (which should not be filtered out) is received and a packet within the range of the filtering rule (which should be filtered out) is not received within a predetermined period.

Apparently, if the SF1 and the SF2 are to be verified, the SF1 and the SF2 may be directly and respectively verified with a similar method, which will not be described in detail here.

It should be understood by those of ordinary skill in the art that the processor described above is a device having data processing capability, and includes, but is not limited to, a Central Processing Unit (CPU).

It should be understood by those of ordinary skill in the art that the functional modules/units in all or some of the operations, the systems and the devices disclosed above may be implemented as software, firmware, hardware, or suitable combinations thereof.

If implemented as hardware, the division between the functional modules/units stated above is not necessarily corresponding to the division of physical components; for example, one physical component may have a plurality of functions, or one function or operation may be performed through cooperation of several physical components.

Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM, more specifically, a Synchronous Dynamic RAM (SDRAM), a Double Data Rate SDRAM (DDR SDRAM), etc.), a Read Only Memory (ROM), an Electrically Erasable Programmable Read-Only Memory (EEPROM), a flash memory or other magnetic storage device; a Compact Disc Read Only Memory (CD-ROM), a Digital Versatile Disc (DVD) or other optical discs; a magnetic cassette, a magnetic tape, a magnetic disk or other magnetic storage devices; and any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A method for verifying a service function chain applied by a sending node, comprising:
   sending service function chain verification request information;
   wherein
   the service function chain verification request information is a Segment Routing packet, and a Segment List of the service function chain verification request information at least comprises a Segment ID of a service function node to be verified; the service function chain verification request information comprises a verification request configured to request a service node of a service function chain to verify the service function node to be verified so as to verify the service function chain, and send a verification result to a check node; and the service node comprises a service function node and a service function forwarder node,
   wherein the service function chain verification request information is function verification request information and comprises a test packet configured to test a function of service function node, and the verification request is configured to request verification of normality of a service function of the service function node to be verified.

2. The method of claim 1, wherein the check node is the sending node; after the service function chain verification request information is sent, the method further comprises:
   receiving the verification result; and
   verifying the service function chain according to the verification result.

3. The method of claim 1, wherein
   the service function node to be verified comprises at least one service function node of the service function chain.

4. The method of claim 1, wherein the service function chain verification request information further comprises identity information configured to indicate an identity of the service function chain verification request information, and the identity information comprises at least one of:
   an identifier; or
   an identity Segment ID corresponding to the Segment ID of the service function node to be verified.

5. The method of claim 1, wherein
   the service function chain verification request information is path verification request information, and the verification request is configured to request verification of a location of the service function node to be verified and a service function type of the service function node to be verified.

6. The method of claim 5, wherein
   the service function node to be verified comprises all service function nodes of the service function chain.

7. The method of claim 5, wherein the service function node to be verified is one service function node of the service function chain;

after the service function chain verification request information is sent, the method further comprises:
taking a next service function node of the service function chain as a service function node to be verified, and returning to the sending service function chain verification request information.

8. The method of claim 1, wherein the service function node to be verified is one service function node of the service function chain.

9. A method for verifying a service function chain applied by a service function forwarder node, comprising:
receiving service function chain verification request information sent by a sending node; and
verifying a subordinate service function node to be verified according to the service function chain verification request information;
wherein
the service function chain verification request information is a Segment Routing packet, and a Segment List of the service function chain verification request information at least comprises a Segment ID of a service function node to be verified; the service function chain verification request information comprises a verification request configured to request a service node of a service function chain to verify the service function node to be verified so as to verify the service function chain, and send a verification result to a check node; and the service node comprises a service function node and a service function forwarder node,
wherein the service function chain verification request information is function verification request information and comprises a test packet configured to test a function of service function node, and the verification request is configured to request verification of normality of a service function of the service function node to be verified.

10. The method of claim 9, after the subordinate service function node to be verified is verified, further comprising:
sending the verification result to the check node.

11. The method of claim 9, wherein the service function chain verification request information is path verification request information, and the verification request is configured to request verification of a location of the service function node to be verified and a service function type of the service function node to be verified; and verifying the subordinate service function node to be verified comprises:
searching a local pre-stored information table for a location and a service function type of the subordinate service function node to be verified according to the service function node to be verified in the service function chain verification request information; and
obtaining the verification result according to the location and the service function type of the service function node to be verified, and sending the verification result to the check node.

12. The method of claim 9, wherein verifying the subordinate service function node to be verified comprises:
sending verification information to the subordinate service function node to be verified according to the service function node to be verified in the service function chain verification request information.

13. The method of claim 12, wherein the verification information is sent to the subordinate service function node to be verified, the method further comprises:
receiving verification feedback information from the service function node to be verified; and
obtaining the verification result according to the verification feedback information, and sending the verification result to the check node.

14. The method of claim 12, wherein sending the verification information to the subordinate service function node to be verified comprises:
forwarding the service function chain verification request information to the subordinate service function node to be verified as the verification information,
or
generating the verification information according to the service function chain verification request information, and sending the verification information to the subordinate service function node to be verified.

15. A method for verifying a service function chain applied by a service function node, comprising:
receiving, from a superordinate connected service function forwarder node, service function chain verification request information sent by a sending node; and
performing verification according to the service function chain verification request information to obtain verification feedback information;
wherein
the service function chain verification request information is a Segment Routing packet, and a Segment List of the service function chain verification request information at least comprises a Segment ID of a service function node to be verified; the service function chain verification request information comprises a verification request configured to request a service node of a service function chain to verify the service function node to be verified so as to verify the service function chain, and send a verification result to a check node; and the service node comprises a service function node and a service function forwarder node,
wherein the service function chain verification request information is function verification request information and comprises a test packet configured to test a function of service function node, and the verification request is configured to request verification of normality of a service function of the service function node to be verified.

16. The method of claim 15, after the verification is performed according to the service function chain verification request information to obtain the verification feedback information, further comprising:
sending the verification feedback information to the superordinate connected service function forwarder node,
or
sending the verification feedback information to the check node as the verification result.

17. A sending node, comprising a processor and a storage having instructions stored thereon which, when being executed by the processor, cause the processor to perform the method of claim 1.

18. A service function forwarder node, comprising a processor and a storage having instructions stored thereon which, when being executed by the processor, cause the processor to perform the method of claim 9.

19. A service function node, comprising a processor and a storage having instructions stored thereon which, when being executed by the processor, cause the processor to perform the method of claim 15.

* * * * *